US007834131B2

(12) United States Patent
Petersen et al.

(10) Patent No.: US 7,834,131 B2
(45) Date of Patent: Nov. 16, 2010

(54) ASYMMETRIC POLYMER FILM, METHOD FOR THE PRODUCTION AND UTILIZATION THEREOF

(75) Inventors: Joachim Petersen, Flieden (DE); Jochen Baurmeister, Eppstein (DE); Oemer Uensal, Mainz (DE); Frauke Jordt, Eppstein (DE); Joachim Kiefer, Losheim am See (DE)

(73) Assignee: BASF Fuel Cell GmbH, Frankfurt (DE)

( * ) Notice: Subject to any disclaimer, the term of this patent is extended or adjusted under 35 U.S.C. 154(b) by 757 days.

(21) Appl. No.: 11/707,743

(22) Filed: Feb. 16, 2007

(65) Prior Publication Data

US 2008/0026277 A1    Jan. 31, 2008

Related U.S. Application Data

(63) Continuation of application No. 10/564,318, filed as application No. PCT/EP2004/07570 on Jul. 9, 2004, now abandoned.

(30) Foreign Application Priority Data

Jul. 11, 2003    (DE)    ............... 103 31 365

(51) Int. Cl.
C08G 73/18    (2006.01)
C08G 73/22    (2006.01)
C08G 73/00    (2006.01)
C08G 73/06    (2006.01)
H01M 8/10    (2006.01)

(52) U.S. Cl. .............. 528/327; 528/363; 528/424; 210/500.21; 210/640; 210/650; 521/25; 521/27

(58) Field of Classification Search .......... 528/327, 528/363, 424; 210/500.21, 640, 650; 429/12; 521/25, 27

See application file for complete search history.

(56) References Cited

U.S. PATENT DOCUMENTS 4,191,618 A    3/1980    Coker et al.
4,212,714 A    7/1980    Coker et al.

(Continued)

FOREIGN PATENT DOCUMENTS

EP    0 141 793 A1    5/1985

(Continued)

OTHER PUBLICATIONS

International Search Report for PCT/EP2004/007570, dated Sep. 27, 2004.

(Continued)

*Primary Examiner*—Duc Truong
(74) *Attorney, Agent, or Firm*—Hammer & Associates, P.C.

(57) ABSTRACT

The present invention relates to an asymmetric polymer film, in particular based on polazoles, a method for the production of the same and its use. The polyazole-based asymmetric polymer film according to the invention has a smooth and a rough side and enables, on account of its asymmetric structure, rapid and homogeneous doping with acids to form a proton-conducting membrane. The polyazole-based asymmetric polymer film according to the invention can be used in diverse ways on account of its excellent chemical, thermal and mechanical properties and is particularly suitable for the production of polymer electrolyte membranes (PEM) for so-called PEM fuel cells.

19 Claims, 6 Drawing Sheets

U.S. PATENT DOCUMENTS

| | | | |
|---|---|---|---|
| 4,272,353 | A | 6/1981 | Lawrence et al. |
| 4,333,805 | A | 6/1982 | Davidson et al. |
| 6,998,464 | B2 | 2/2006 | Guth et al. |

FOREIGN PATENT DOCUMENTS

| | | |
|---|---|---|
| EP | 0816415 A2 | 1/1998 |
| JP | 2001-118591 A | 4/2001 |
| WO | WO 02/04083 A2 | 1/2002 |
| WO | WO 02/071518 A1 | 9/2002 |

OTHER PUBLICATIONS

International Preliminary Report on Patentability from counterpart International Application No. PCT/EP2004/007570, dated May 29, 2006.

Written Opinion of the International Preliminary Examining Authority from counterpart International Application No. PCT/EP2004/007570.

Gang, X., et al., "Electrolyte Additives for Phosphoric Acid Fuel Cells", *J. Electrochem, Soc.*, 140(4):896-902 (Apr. 1993).

Razaq, M. et al., "Perfluorosulfonimide as an Additive in Phosphoric Acid Fuel Cell", *J. Electrochem. Soc.*, 136(2)385-390 (Feb. 1989).

ASYMMETRIC POLYMER FILM, METHOD FOR THE PRODUCTION AND UTILIZATION THEREOF

RELATED APPLICATIONS

This application is a continuation of U.S. application Ser. No. 10/564,318 filed Jan. 1, 2006 now abandoned, which is the U.S. National Stage of International Application No. PCT/EP2004/007570, filed Jul. 9, 2004, published in German, and claims priority under 35 U.S.C. §119 or 365 to German Application No. 103 31 365.6, filed Jul. 11, 2003. The entire teachings of the above applications are incorporated herein by reference.

BACKGROUND OF THE INVENTION

The present invention relates to an asymmetric polymer film, in particular based on polyazoles, a method for the production of the same and its use.

SUMMARY OF THE INVENTION

In one embodiment, the present invention is a polymer film comprising a polyazole polymer, said film having a smooth and a rough side, wherein the roughness of the smooth side is less than 2 µm and the roughness of the rough side is between 3 to 10 µm.

In another embodiment, the present invention is a method for the production of a polymer film comprising a polyazole polymer, said film having a smooth and a rough side. The method comprises the steps of depositing of a solution and/or suspension containing polyazole polymer in a solvent on a carrier; drying the layer formed according to the previous step; and detaching the dried polymer film from the carrier. The surface of the carrier is preferably is roughened in such a way that the desired roughness is obtained, with the formation of a two-dimensional layer. The roughness of the smooth side is less than 2 µm and the roughness of the rough side is between 3 to 10 µm.

In another embodiment, the present invention is an electrochemical cell that includes at least one electrode. The electrode includes at least one polymer membrane comprising a polyazole polymer film. The polymer film has a smooth and a rough sides. The roughness of the smooth side is less than 2 µm and the roughness of the rough side is between 3 to 10 µm.

In another embodiment, the present invention is a membrane electrode unit, comprising at least one polymer membrane. The membrane includes a polyazole polymer film. The polymer film has a smooth and a rough side. The roughness of the smooth side is less than 2 µm and the roughness of the rough side is between 3 to 10 µm.

DETAILED DESCRIPTION OF THE INVENTION

Figure 1A:
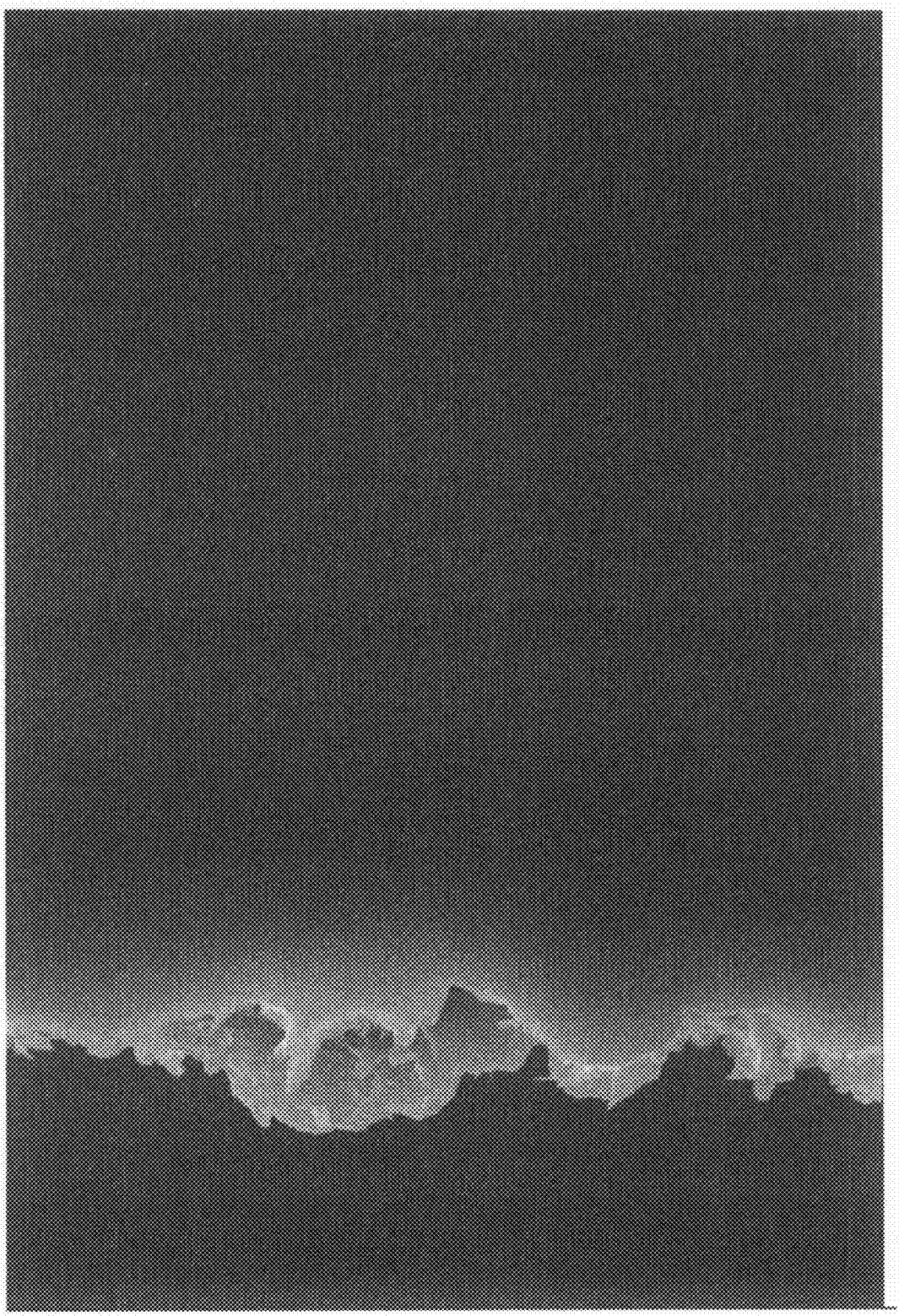
FIG. 1a is a scanning electron microscopic image of the roughened side of an asymmetric polyazole membrane according to the invention.

A description of example embodiments of the invention follows.

The polymer film according to the invention can be used in diverse ways on account of its excellent chemical, thermal and mechanical properties and is particularly suitable as a polymer electrolyte membrane (PEM) in so-called PEM fuel cells.

In order for them to be suitable for use in PEM fuel cells, the polyazole membranes must be doped with acid. For this purpose, the basic polyazole membranes are treated with concentrated phosphoric acid or sulphuric acid and act as proton conductors and separators in so-called polymer electrolyte membrane fuel cells (PEM fuel cells).

Due to the excellent properties of polyazole polymers, such polymer electrolyte membranes—processed into membrane electrode units (MEE)—can be used in fuel cells at long-term operating temperatures above 100° C., in particular above 120° C. This high long-term operating temperature makes it possible to increase the activity of the catalysts on a noble metal base contained in the membrane electrode unit (MEE). Especially with the use of so-called reformates from hydrocarbons, considerable quantities of carbon monoxide are contained in the reformer gas, which usually have to be removed by means of costly gas treatment or gas purification. As a result of the possibility of increasing the operating temperature, much higher concentrations of CO impurities can be tolerated over the long term.

By the use of polymer electrolyte membranes based on polyazole polymers, it is possible on the one hand partially to dispense with the costly gas treatment or gas purification and on the other hand to reduce the catalyst charge in the membrane electrode unit. Both these factors are an essential prerequisite for the large-scale use of PEM fuel cells, because otherwise the cost of a PEM fuel cell system is too high.

The doping of polymer membranes with strong acids is often bound up with considerable outlay, since the absorption of the acid on the smooth surface of the membrane takes place only slowly. Consequently, inhomogeneous acid doping often results over the cross-section of the membrane, and this leads to unsatisfactory reproduceability.

After being doped with acid, the polymer membranes based on polyazoles known hitherto still exhibit—for the aforementioned intended purpose—inadequate mechanical properties. This mechanical instability shows itself in a low modulus of elasticity, a low resistance to tearing and a low fracture toughness.

On account of the desired applications for PEM fuel cells, in particular in the automotive and steady-state sector, a high reproduceability of the membranes to be used is however desired and the previously known methods still need to be improved.

The problem of the present invention, therefore, is to make available a polymer membrane based on polyazoles, which on the one hand guarantees homogeneous acid doping over the whole cross-section of the membrane and which at the same time can be obtained in a technically feasible process.

Surprisingly, it was found that an asymmetric polymer film based on polyazoles, which possesses both a smooth and a rough side, permits a much more rapid and more homogeneous acid absorption during doping and can thus be produced economically, i.e. in a shorter time, and with a high degree of reproduceability. Furthermore, the doped polymer membranes produced with the method according to the invention have good mechanical properties and an excellence proton conductivity.

The subject-matter of the present invention is an asymmetric polymer film based on polyazoles, which has a smooth and a rough side, whereby the roughness of the smooth side is <2 µm, in particular <1 µm, and the roughness the rough side amounts to between 3 to 10 µm, preferably 4 to 8.5 µm, in particular 4 to 7 µm.

The roughness of the polymer film according to the invention is determined by means of scanning electron microscopic (SEM) images. The depth of the craters (layer thickness) is designated as the roughness. As can be seen from FIG. 1, the polymer film according to the invention has markedly different surfaces. Whilst the smooth side reveals a predominantly regular structure with only fairly small unevennesses in a depth of <2 µm, in particular <1 µm, the rough side of the film exhibits a layer thickness (depth) in the range from 3 to 10 µm, preferably 4 to 8.5 µm, in particular 4 to 7 µm.

Polyazoles within the meaning of the present invention are understood to mean polymers containing recurring azole units of the general formula (I) and/or (II) and/or (III) and/or (IV) and/or (V) and/or (VI) and/or (VII) and/or (VIII) and/or (IX) and/or (X) and/or (XI) and/or (XII) and/or (XIII) and/or (XIV) and/or (XV) and/or (XVI) and/or (XVI) and/or (XVII) and/or (XVIII) and/or (XIX) and/or (XX) and/or (XXI) and/or (XXII)

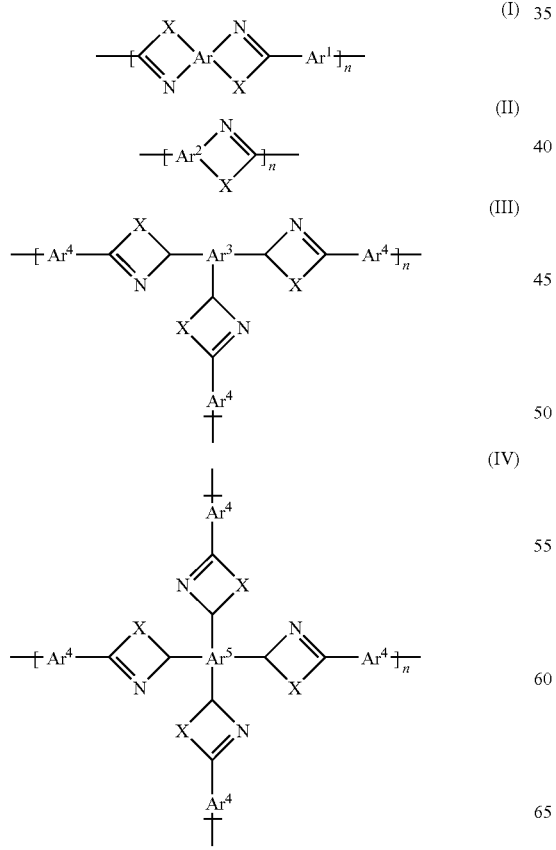

(I)
(II)
(III)
(IV)

-continued

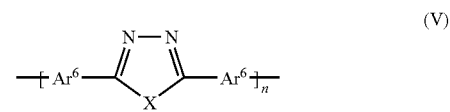

(V)

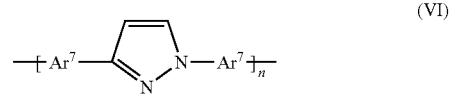

(VI)

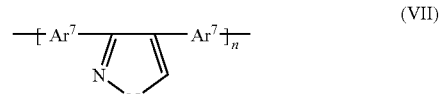

(VII)

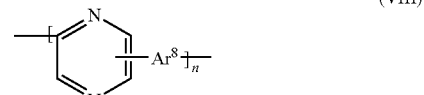

(VIII)

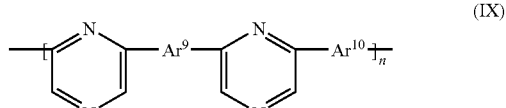

(IX)

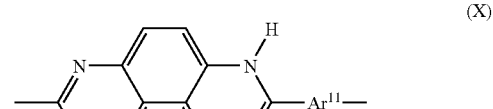

(X)

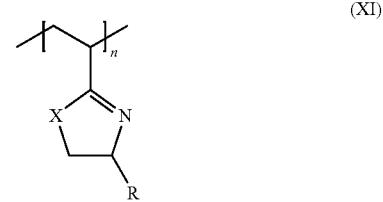

(XI)

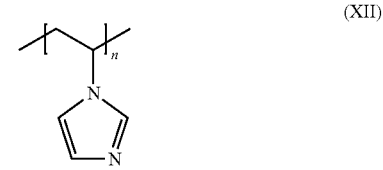

(XII)

(XIII)

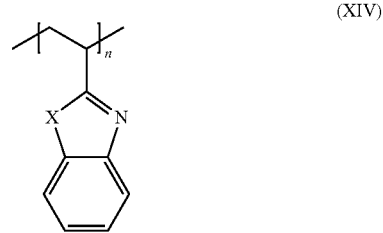

(XIV)

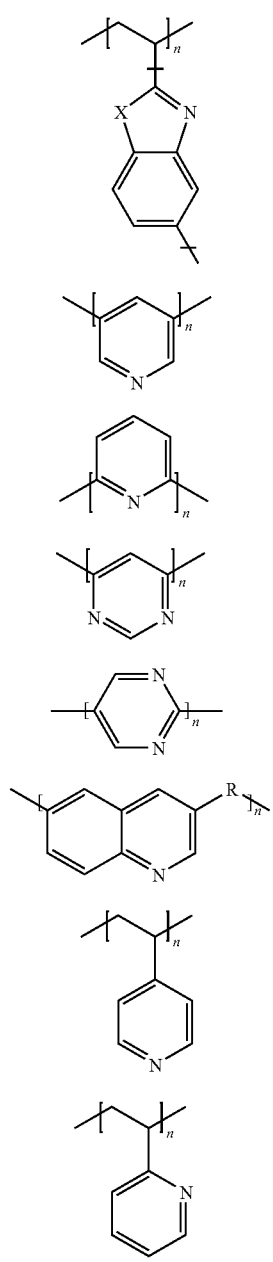

where

Ar are identical or different and stand for a tetravalent aromatic or heteroaromatic group, which can be mononuclear or polynuclear, $Ar^1$ are indentical or different and stand for a bivalent aromatic or heteroaromatic group, which can be mononuclear or polynuclear, $Ar^2$ are indentical or different and stand for a bivalent or trivalent aromatic or heteroaromatic group, which can be mononuclear or polynuclear, $Ar^3$ are indentical or different and stand for a trivalent aromatic or heteroaromatic group, which can be mononuclear or polynuclear, $Ar^4$ are indentical or different and stand for a trivalent aromatic or heteroaromatic group, which can be mono mononuclear or polynuclear, $Ar^5$ are indentical or different and stand for a tetravalent aromatic or heteroaromatic group, which can be mononuclear or polynuclear, $Ar^6$ are indentical or different and stand for a bivalent aromatic or heteroaromatic group, which can be mononuclear or polynuclear, $Ar^7$ are indentical or different and stand for a bivalent aromatic or heteroaromatic group, which can be mononuclear or polynuclear, $Ar^8$ are indentical or different and stand for a trivalent aromatic or heteroaromatic group, which can be mononuclear or polynuclear, $Ar^9$ are indentical or different and stand for a bivalent or trivalent or tetravalent aromatic or heteroaromatic group, which can be mononuclear or polynuclear, $Ar^{10}$ are indentical or different and stand for a bivalent or trivalent aromatic or heteroaromatic group, which can be mononuclear or polynuclear, $Ar^{11}$ are indentical or different and stand for a bivalent aromatic or heteroaromatic group, which can be mononuclear or polynuclear, X is identical or different and stands for oxygen, sulphur or an amino group, which carries a hydrogen atom, a group having 1-20 carbon atoms, preferably a branched or unbranched alkyl or alkoxy group, or an aryl group as a further radical R identical or different, stands for hydrogen, an alkyl group and an aromatic group, whereby radical R in formula (XX) is different from hydrogen, and n, m is a whole number greater than or equal to 10, preferably greater than or equal to 100.

Preferred aromatic or heteroaromatic groups are derived from benzene, naphthalene, biphenyl, diphenylether, diphenylmethane, diphenyldimethylmethane, bisphenone, diphenyl sulphone, quinoline, pyridine, bipyridine, pyridazine, pyrimidine, pyrazine, triazine, tetrazine, pyrole, pyrazole, anthracene, benzopyrrole, benzotriazole, benzooxathiadiazole, benzooxadiazole, benzopyridine, benzopyrazine, benzopyrazidine, benzopyrimidine, benzopyrazine, benzotriazine, indolizine, quinolizine, pyridopyridine, imidazopyrimidine, pyrazinopyrimidine, carbazole, aciridine, phenazine, benzoquinoline, phenoxazine, phenothiazine, acridizine, benzopteridine, phenanthroline and phenanthrene, which can if necessary also be substituted.

The substitution pattern of $Ar^1$, $Ar^4$, $Ar^6$, $Ar^7$, $Ar^8$, $Ar^9$, $Ar^{10}$, $Ar^{11}$ is arbitrary, in the case of phenylene for example, $Ar^1$, $Ar^4$, $Ar^6$, $Ar^7$, $Ar^8$, $Ar^9$, $Ar^{10}$, $Ar^{11}$ can be ortho-, meta- and para-phenylene. Particularly preferred groups are derived from benzene and biphenylene, which if necessary can also be substituted.

Preferred alkyl groups are short-chain alkyl groups with 1 to 4 carbon atoms, such as for example methyl, ethyl, n- or i-propyl and t-butyl groups.

Preferred aromatic groups are phenyl or naphthyl groups. The alkyl groups and the aromatic groups can be substituted.

Preferred substituents are halogen atoms such as for example fluorine, amino groups, hydroxy groups or short-chain alkyl groups such as for example methyl or ethyl groups.

Preference is given to polyazoles with recurring units of the formula (I), with which X radicals inside a recurring unit are identical.

The polyazoles can in principle also have different recurring units, which differ for example in their X radical. Preferably, however, there are only identical X radicals in a recurring unit.

Further preferred polyazole polymers are polyimidazoles, polybenzthiazoles, polybenzoxazoles, polyoxadiazoles, polyquinoxalines, polythiadiazoles poly(pyridines), poly(pyrimidines), and poly(tetrazapyrenes).

In another embodiment of the present invention, the polymer containing recurring azole units is a copolymer or a blend, which contains at least two units of the formula (I) to (XXII), which differ from one another. The polymers can be present as block copolymers (diblock, triblock), random copolymers, periodic copolymers and/or alternating polymers.

In a particularly preferred embodiment of the present invention, the polymer containing recurring azole units is a polyazole, which contains only units of the formula (I) and/or (II).

The number of recurring azole units in the polymer is preferably a whole number greater than or equal to 10. Particularly preferred polymers contain at least 100 recurring azole units.

Within the scope of the present invention, polymers containing recurring benzimidazole units are preferred. Several examples of the extremely expedient polymers containing recurring benzimidazole units are reproduced by means of the following formulas:

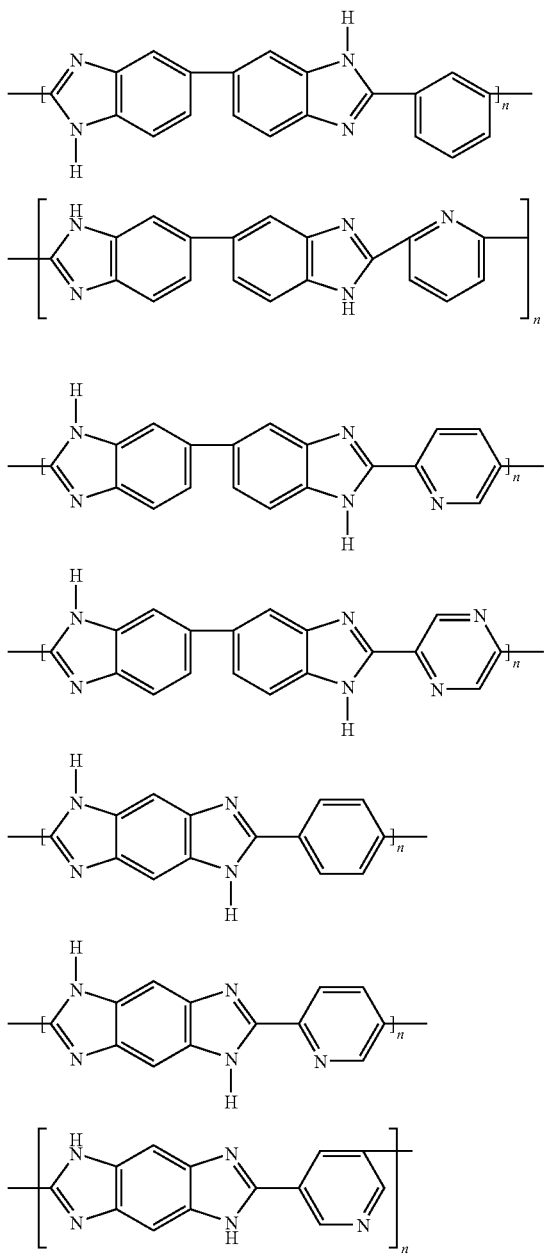
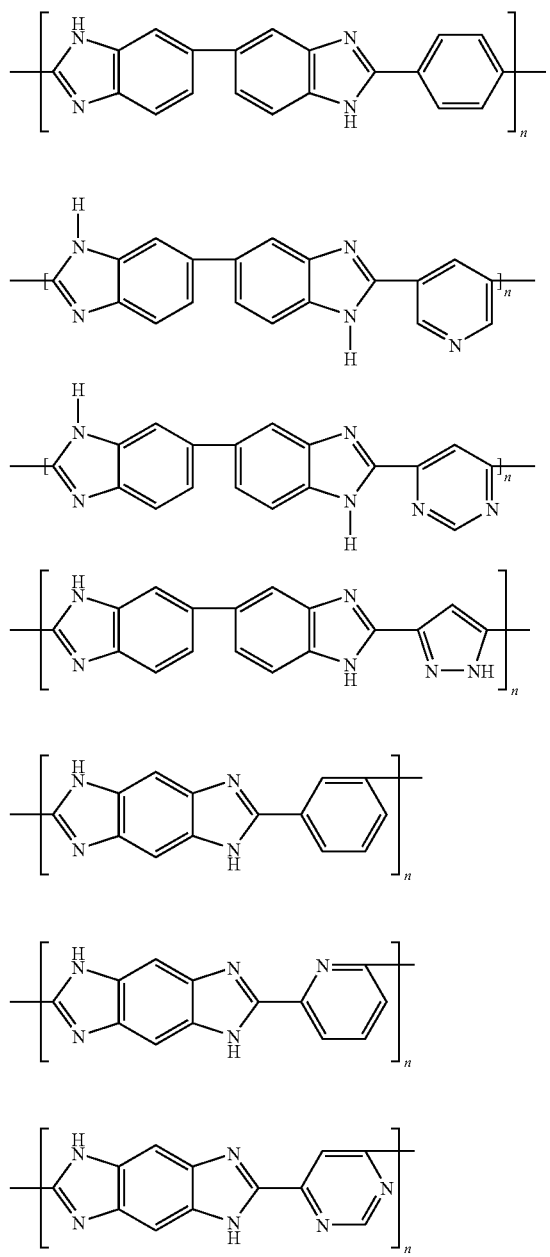

-continued

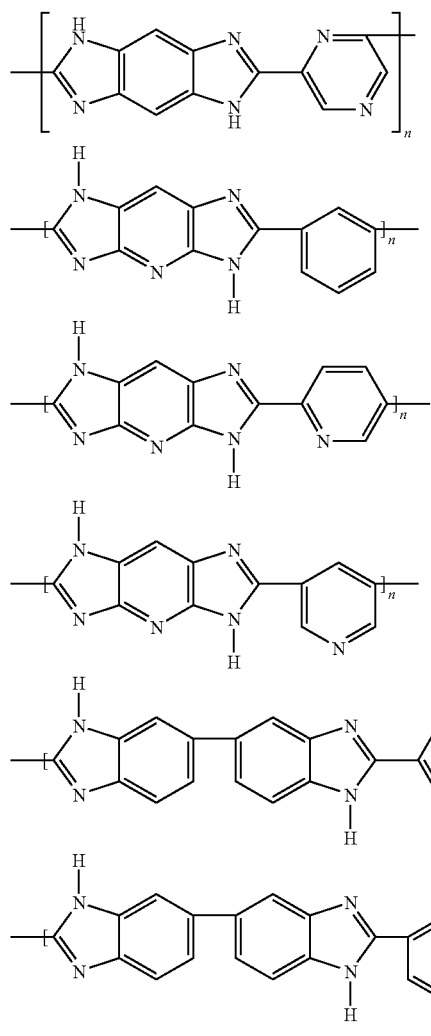
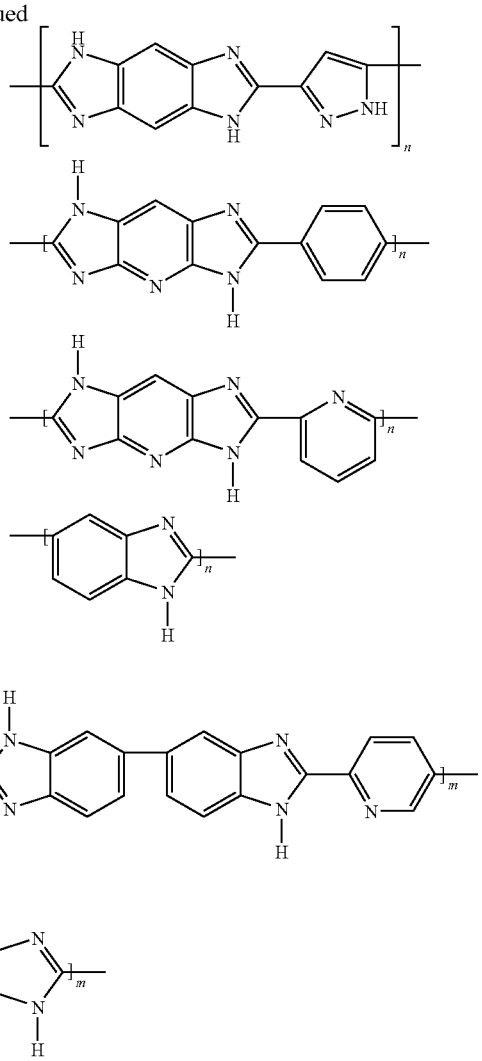

where n and m is a whole number greater than or equal to 10, preferably greater than or equal to 100.

The polyazoles used, but in particular the polybenzimidazoles, have a high molecular weight. This amounts, measured as intrinsic viscosity, to at least 0.8 dl/g, preferably at least 1.1 dl/g.

The production of the polymer film according to the invention takes place with the steps A) deposition of a solution and/or suspension containing polyazole polymer in a solvent on a carrier, the surface whereof is roughened in such a way that the desired roughness is obtained, with the formation of a two-dimensional layer,
B) drying of the layer formed according to step A) and
C) detachment of the dried polymer film from the carrier.

The production of polymer solutions based on polyazoles is described in detail in the prior art. EP-A-0816415 thus describes a method for the dissolution of polymers based on polyazoles using N,N-dimethylacetamide as a polar, aprotic solvent at temperatures above 260° C. A much milder process for the production of solutions based on polyazoles is disclosed in German patent application 10052237.8.

The layer formation takes place by means of measures known per se (pouring, spraying, application by squeegee) which are known from the prior art in respect of polymer film production. The layer thus produced has a thickness between 15 and 4000 µm, preferably between 20 and 3500 µm, in particular between 30 and 2000 µm.

All carriers that can be designated as inert under the conditions are suitable as a carrier, use usually being made of metal strips, although all other materials can also be used that are inert under the conditions and permit the required roughness. The use of metal strips further permits the possibility of coating the latter superficially with alloys.

In order to obtain a roughened surface onto which the polymer solution can be applied according to the invention, it has proved to be advisable to roughen the surface of the strips. Possibilities for roughening are for example sandblasting or rubbing down the surface of the metal strip. Such methods are known to the person skilled in the art.

The layer located on the carrier is then dried in step C) until the film thus produced is self-supporting. The side of the film facing away from the carrier, as in the case of the known methods, is also smooth and regular, whereas the side located on the carrier has a roughened surface, analogous to the surface structure of the carrier.

The scanning electron microscopic (SEM) images show very clearly the difference in the structure of the roughened and the smooth side of the film.

The drying of the film in step C) takes place at temperatures between room temperature and 300° C. The drying takes place under normal pressure or reduced pressure. The drying time is dependent on the thickness of the film thus formed and amounts to between 10 seconds and 24 hours. The film dried according to step C) is then self-supporting and can be processed further. The drying takes place by means of drying methods customary in the film industry.

Insofar as a polar, aprotic organic solvent has been used, the latter is largely removed with the aid of the drying carried out in step C). The residual content of polar, aprotic organic solvent after drying usually amounts to between 10-23 wt. %.

The thickness of the polymer film is reduced as a result of the drying. After drying, it amounts to between 10 and 3500 μm, preferably between 15 and 3000 μm, in particular between 25 and 1800 μm.

A further reduction in the residual content of solvent to below 2 wt. % can be achieved by increasing the drying temperature and drying time, although the subsequent doping of the film, for example with phosphoric acid, is made much more difficult.

In order to improve the performance characteristics for applications as a polymer electrolyte membrane, the polymer film according to the invention can be freed from residual solvents in a subsequent procedure. The corresponding procedure is described in WO 02/071518.

The asymmetric polymer film based on polyazoles formed according to step C) can then be treated further. This is understood to mean, in particular, the cross-linking of the surface. This can take place by the action of heat in the presence of atmospheric oxygen at the surface. This hardening of the film surface additionally improves the properties of the film.

Furthermore, the cross-linking can also take place by the action of IR or NIR (IR=infrared, i.e. light with a wavelength of more than 700 nm; NIR=near IR, i.e. light with a wavelength in the range from approx. 700 to 2000 nm or energy in the range from approx. 0.6 to 1.75 eV). Another method is irradiation with β-rays. The radiation dose amounts here to between 5 and 200 kGy.

For the purpose of doping, the film obtained according to step C) is wetted with a doping agent or is placed in the latter. As doping agents for the polymer membranes according to the invention, use is made of acids, preferably all known Lewis and Brønsted acids, in particular inorganic Lewis and Brønsted acids.

Apart from these aforementioned acids, the use of polyacids is also possible, in particular isopolyacids and heteropolyacids as well as mixtures of different acids. Heteropolyacids within the meaning of the present invention denote inorganic polyacids with at least two different central atoms, which arise in each case from weak, polybasic oxo-acids of a metal (preferably Cr, Mo, V, W) and a nonmetal (preferably As, I, P, Se, Si, Te) as partial mixed anhydrides. These include, amongst others, 12-molybdophosphoric acid and 12-tungstophosphoric acid.

Particularly preferred doping agents are sulphuric acid and phosphoric acid. A very particularly preferred doping agent is phosphoric acid ($H_3PO_4$).

In the doping of the films according to the invention, it has surprisingly been shown that the acid soaks in very rapidly on the rough side of the film.

If, for example, a drop of phosphoric acid (85% phosphoric acid) is deposited onto the rough surface of the film, it emerges that the phosphoric acid penetrates very rapidly into the film. As the drop sinks deeper into the film, the contact angle constantly diminishes. With the films according to the invention, a reduction of the contact angle to values of <10° is observed within 1 minute after deposition of the drop.

When a drop of phosphoric acid is deposited onto a smooth film surface, on the other hand, there is merely a spreading of the drop. The contact angle diminishes much more slowly. After 10 minutes, the contact angle still stands at >35°, without the drop of phosphoric acid being wholly absorbed by the film.

A homogeneous absorption of the acid occurs with the doping of the asymmetric polymer film according to the invention on the roughened side. Another advantage lies in the improved reproduceability of the doping of the present films compared with conventional films and a saving of time in the doping process, which is important especially in the large-scale production of polymer electrolyte membranes.

The asymmetric polymer films according to the invention are preferably doped. Within the scope of the present invention, doped polymer membranes denote polymer membranes which, on account of the presence of doping agents, exhibit an increased proton conductivity compared with undoped polymer membranes.

Methods for the production of doped polymer membranes are known. In a preferred embodiment of the present invention, they are obtained by the fact that a film of the polymer concerned is wetted with concentrated acid, preferably with highly concentrated phosphoric acid, as described above over a suitable time, preferably 1 minute-96 hours, particularly preferably 10 minutes-50 hours, at temperatures between room temperature and 100° C. and if need be under raised pressure. With the membrane according to the invention, the doping process can be shortened down to ⅕ of the original time, since the acid absorption on the roughened membrane side takes place much more rapidly.

The conductivity of the polymer membrane according to the invention can be influenced by the degree of doping. The conductivity increases with increasing concentration of doping agent until such time as a maximum value is reached. According to the invention, the degree of doping is given as mol acid per mol recurring unit of the polymer. Within the scope of the present invention, a degree of doping between 3 and 15, in particular between 6 and 12, is preferred.

For the further improvement of the application properties, fillers, in particular proton-conducting fillers, and additional acids can be added to the membrane or the film. The addition usually takes place in step A).

Non-limiting examples of proton-conducting fillers are sulphates such as: $CsHSO_4$, $Fe(SO_4)_2$, $(NH_4)_3H(SO_4)_2$, $LiHSO_4$, $NaHSO_4$, $KHSO_4$, $RbSO_4$, $LiN_2H_5SO_4$, $NH_4HSO_4$, phosphates such as $Zr_3(PO_4)_4$, $Zr(HPO_4)_2$, $HZr_2(PO_4)_3$, $UO_2PO_4.3H_2O$, $H_8UO_2PO_4$, $Ce(HPO_4)_2$, $Ti(HPO_4)_2$, $KH_2PO_4$, $NaH_2PO_4$, $LiH_2PO_4$, $NH_4H_2PO_4$, $CsH_2PO_4$, $CaHPO_4$, $MgHPO_4$, $HSbP_2O_8$, $HSb_3P_2O_{14}$, $H_5Sb_5P_2O_{20}$, polyacids such as $H_3PW_{12}O_{40}.nH_2O$ (n=21-29), $H_3SiW_{12}O_{40}.nH_2O$ (n=21-29), $H_xWO_3$, $HSbWO_6$, $H_3PMo_{12}O_{40}$, $H_2Sb_4O_{11}$, $HTaWO_6$, $HNbO_3$, $HTiNbO_5$, $HTiTaO_5$, $HSbTeO_6$, $H_5Ti_4O_9$, $HSbO_3$. $H_2MoO_4$ selenites and arsenides such as $(NH_4)_3H(SeO_4)_2$, $UO_2AsO_4$, $(NH_4)_3H(SeO_4)_2$, $KH_2AsO_4$, $Cs_3H(SeO_4)_2$, $Rb_3H(SeO_4)_2$, oxides such as $Al_2O_3$, $Sb_2O_5$, $ThO_2$, $SnO_2$, $ZrO_2$, $MoO_3$ silicates such as zeolites, zeolites(NH$_4$+), layer silicates, framework silicates, H-natrolites, H-mordenites, NH$_4$-analcines, NH$_4$-sodalites, NH$_4$-gallates, H-montmorillonites acids such as HClO$_4$, SbF$_5$ fillers such as carbides, in particular SiC, Si$_3$N$_4$, fibres, in particular glass fibres, glass powders and/or polymer fibres, preferably based on polyazoles.

Furthermore, these membranes can also contain perfluorinated sulphonic acid additives (0.1-20 wt. %, preferably 0.2-15 wt. %, very preferably 0.2-10 wt. %). These additives lead to an improvement in performance, close to the cathode to an increase in the oxygen solubility and oxygen diffusion and to a reduction in the adsorption of phosphoric acid and phosphate to form platinum. (Electrolyte additives for phosphoric acid fuel cells. Gang, Xiao; Hjuler, H. A.; Olsen, C.; Berg, R. W.; Bjerrum, N. J. Chem. Dep. A, Tech. Univ. Denmark, Lyngby, Den. J. Electrochem. Soc. (1993), 140(4), 896-902 and Perfluorosulfonimide as an additive in phosphoric acid fuel cell. Razaq, M.; Razaq, A.; Yeager, E.; DesMarteau, Darryl D.; Singh, S. Case Cent. Electrochem. Sci., Case West. Reserve Univ., Cleveland, Ohio, USA. J. Electrochem. Soc. (1989), 136(2), 385-90.)

Non-limiting examples of persulphonated additives are:

trifluomethane sulphonic acid, potassium trifluormethane sulphonate, sodium trifluormethane sulphonate, lithium trifluormethane sulphonate, ammonium trifluormethane sulphonate, potassium perfluorohexane sulphonate, sodium perfluorohexane sulphonate, lithium perfluorohexane sulphonate, ammonium perfluorohexane sulphonate, perfluorohexane sulphonic acid, potassium nonafluorbutane sulphonate, sodium nonafluorbutane sulphonate, lithium nonafluorbutane sulphonate, ammonium nonafluorbutane sulphonate, cesium nonafluorbutane sulphonate, triethylammonium perfluorohexasulphonate, perflurosulphoimides and Nafion.

Furthermore, the membrane or film can also contain as additives those that capture (primary antioxidants) or destroy (secondary antioxidants) peroxide radicals produced during operation in the oxygen reduction and thereby improve, as described in JP2001118591 A2, the life and stability of the membrane and the membrane electrode unit. The mode of functioning and molecular structures of such additives are described in F. Gugumus in Plastics Additives, Hanser Verlag, 1990; N. S. Allen, M. Edge Fundamentals of Polymer Degradation and Stability, Elsevier, 1992; or H. Zweifel, Stabilization of Polymeric Materials, Springer, 1998.

Non-limiting examples of such additives are:

bis(trifluormethyl)nitroxide, 2,2-diphenyl-1-picrinylhydrazyl, phenols, alkyl phenols, sterically hindered alkyl phenols such as for example Irganox, aromatic amines, sterically hindered amines such as for example Chimassorb; sterically hindered hydroxylamines, sterically hindered alkyl amines, sterically hindered hydroxylamines, sterically hindered hydroxylamine ether, phosphites such as for example Irgafos, nitrosobenzol, methyl.2-nitroso-propane, benzophenone, benzaldehyde-tert.-butylnitron, cysteamine, melanines, lead oxides, manganese oxides, nickel oxides, cobalt oxides.

Possible areas of application of the polymer films according to the invention include, amongst others, use as a filter medium, in particular in gas filtration and separation or gas purification, as well as in reverse osmosis, as a substrate in the electronics industry, especially for flexible electric circuits, printed electric circuits, in transistors, capacitors and other electronic components, as battery separators, as protective film for electric cables, as insulators in electrical components and devices such as capacitors, as protective film for metal surfaces and other surfaces.

Possible areas of application of doped polymer membranes according to the invention include, amongst others, use in fuel cells, in electrolysis, in capacitors and in battery systems. On account of their property profile, the doped polymer membranes are preferably used in fuel cells.

The present invention also relates to a membrane electrode unit, which has at least one asymmetric doped polymer membrane according to the invention. For further information concerning membrane electrode units, reference is made to the technical literature, in particular to U.S. Pat. No. 4,191,618, U.S. Pat. No. 4,212,714 and U.S. Pat. No. 4,333,805. The disclosure concerning the structure and the production of membrane electrode units contained in the aforementioned references [U.S. Pat. No. 4,191,618, U.S. Pat. No. 4,212,714 and U.S. Pat. No. 4,333,805] is also a component part of the description.

The invention is explained in greater detail below with the aid of examples and a comparative example, without the invention thereby being restricted to these examples.

EXEMPLIFICATION

Figure 1B:
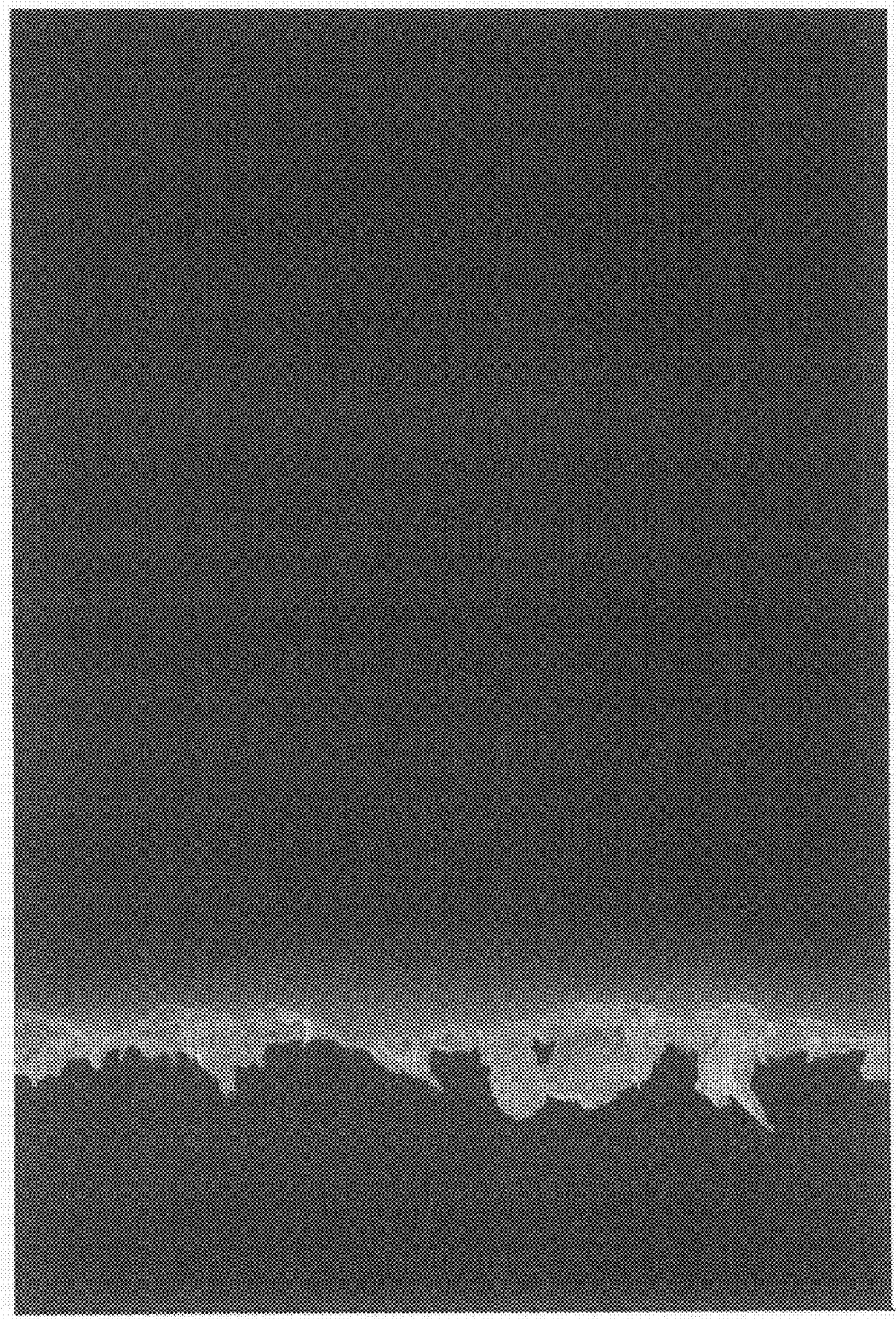
FIG. 1b is scanning electron microscopic images of the roughened side of an asymmetric polyazole membrane according to the invention.

FIGS. 1a and 1b show scanning electron microscopic images of the roughened side of an asymmetric polyazole membrane according to the invention. As can be seen, the membrane is roughened over a layer thickness (depth) of 4,775 μm (FIG. 1b) and 6,350 μm (FIG. 1a) respectively.

Figure 2:
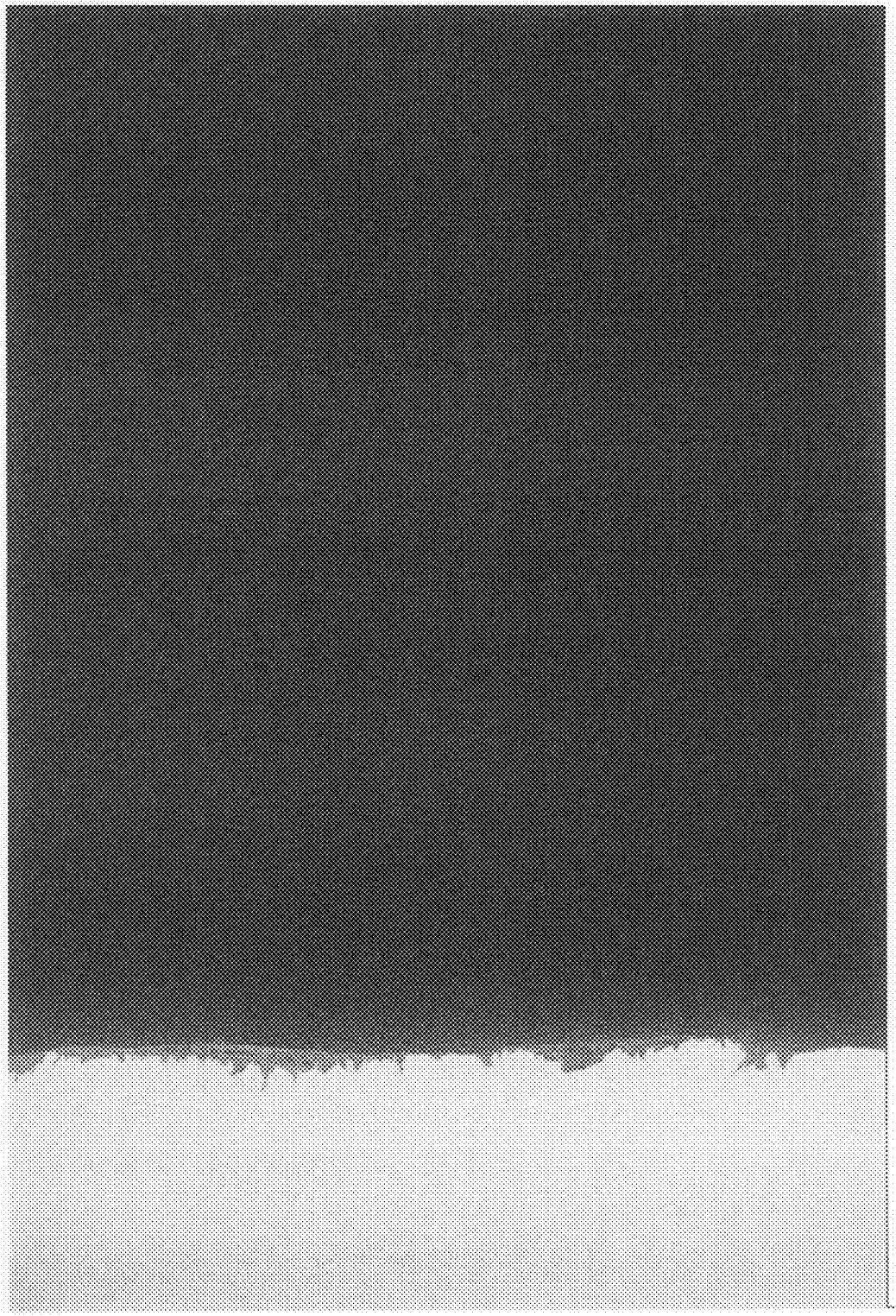
FIG. 2 is a scanning electron microscopic image of the smooth side of a polyazole membrane.

In comparison, FIG. 2 shows a scanning electron microscopic image of the smooth side of a polyazole membrane. Compared to FIGS. 1a and 1b, a predominantly regular surface can be seen here. The fine unevennesses can only be made out more precisely with great magnification and do not go beyond a layer thickness of 2 μm.

Figure 3A:
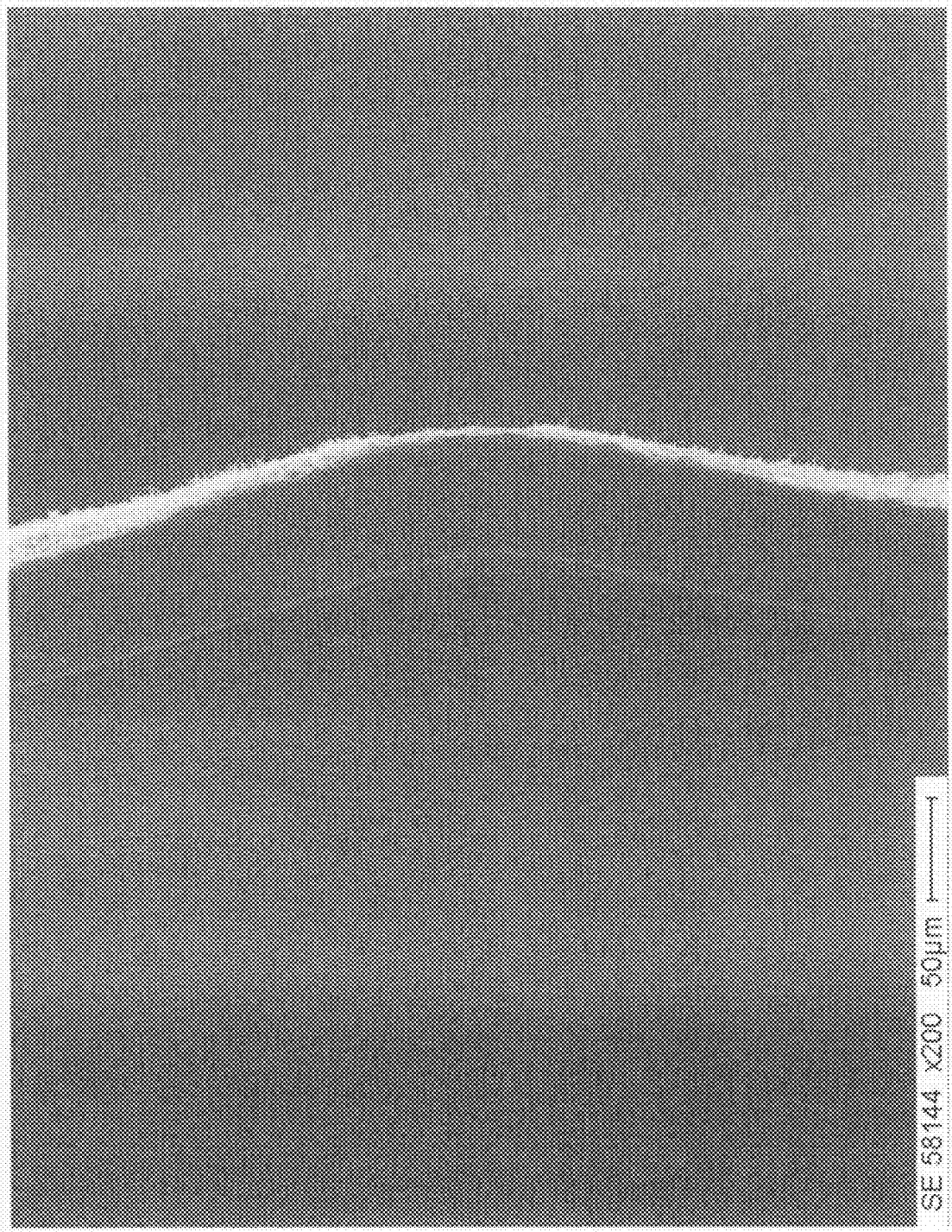
FIG. 3a is a scanning electron micrograph of the asymmetric membrane according to the invention.
Figure 3B:
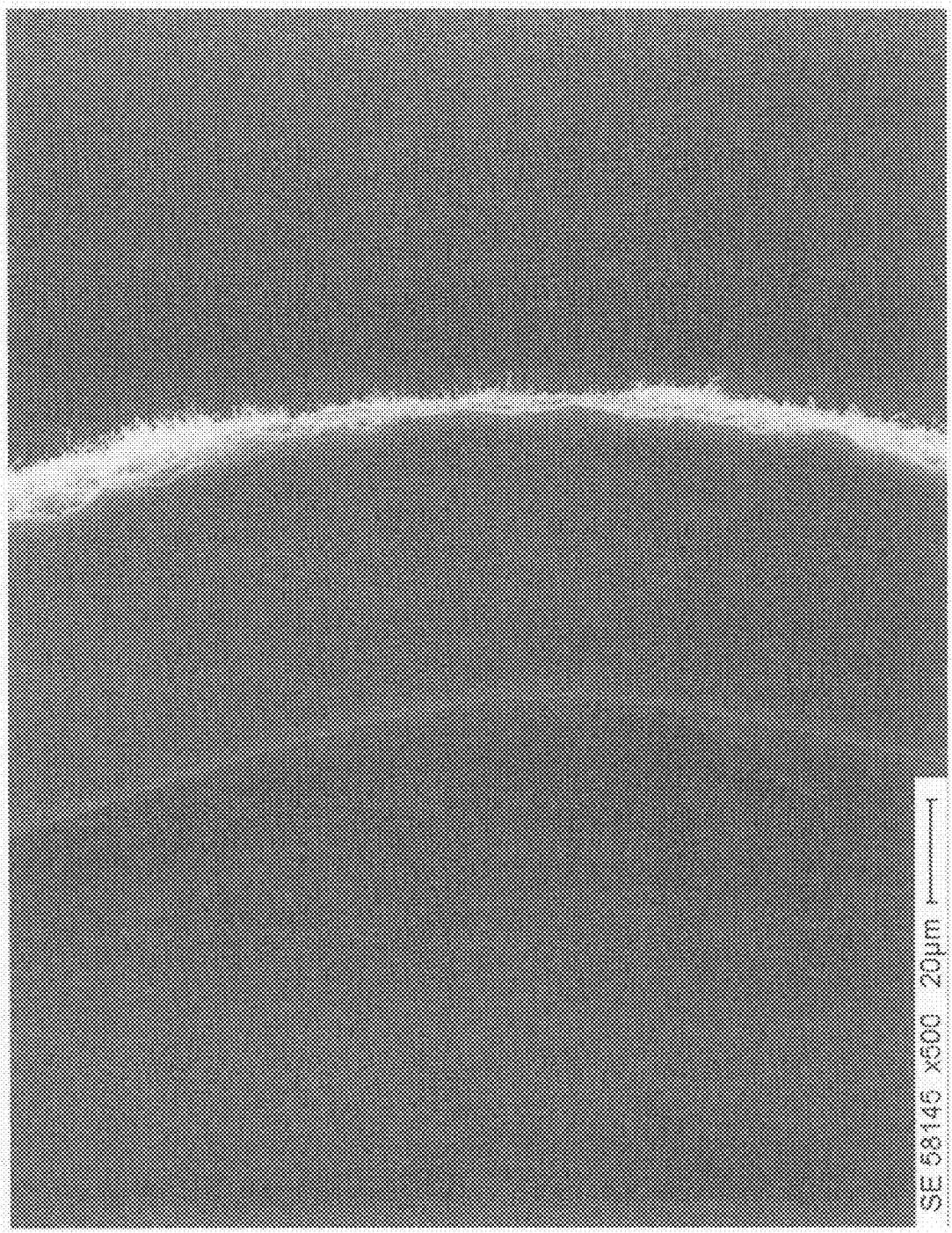
FIG. 3b is a scanning electron micrograph of the asymmetric membrane according to the invention.

FIGS. 3a and 3b show once again the asymmetric membrane according to the invention over the whole diameter. Here too, the difference between the roughened and the smooth membrane side can again clearly be seen.

Example 1

Measurement of the Contact Angle

Comparison of the penetration rate of a drop of phosphoric acid on the smooth and the rough surface of an asymmetric polyazole membrane produced according to the invention.

A drop of phosphoric acid is produced on the membrane surface and the contact angle is measured by means of a light-optical microscope. Said contact angle is obtained from the drop contour analysis from the mean values of the two tangents at the interface air/film/phosphoric acid.

On an asymmetric polyazole membrane obtained according to the invention, a drop of 85% phosphoric acid is deposited on the roughened side of the film. It can clearly be seen that the acid drop rapidly soaks into the rough surface. The contact angle diminishes within one minute to a value of <10°.

The same test is carried out on the second smooth side of the polyazole membrane. In contrast with the previously conducted test, the drop merely spreads out on the membrane surface. Even after 10 minutes, the acid drop had still not penetrated to a noteworthy extent into the surface of the membrane. The contact angle after 10 minutes still stood at >35°.

The measurement of the contact angle as a function of time was determined from a drop contour analysis using a contact angle measuring device of type G10/DAS 10 from the firm Krüss.

Figure 4:
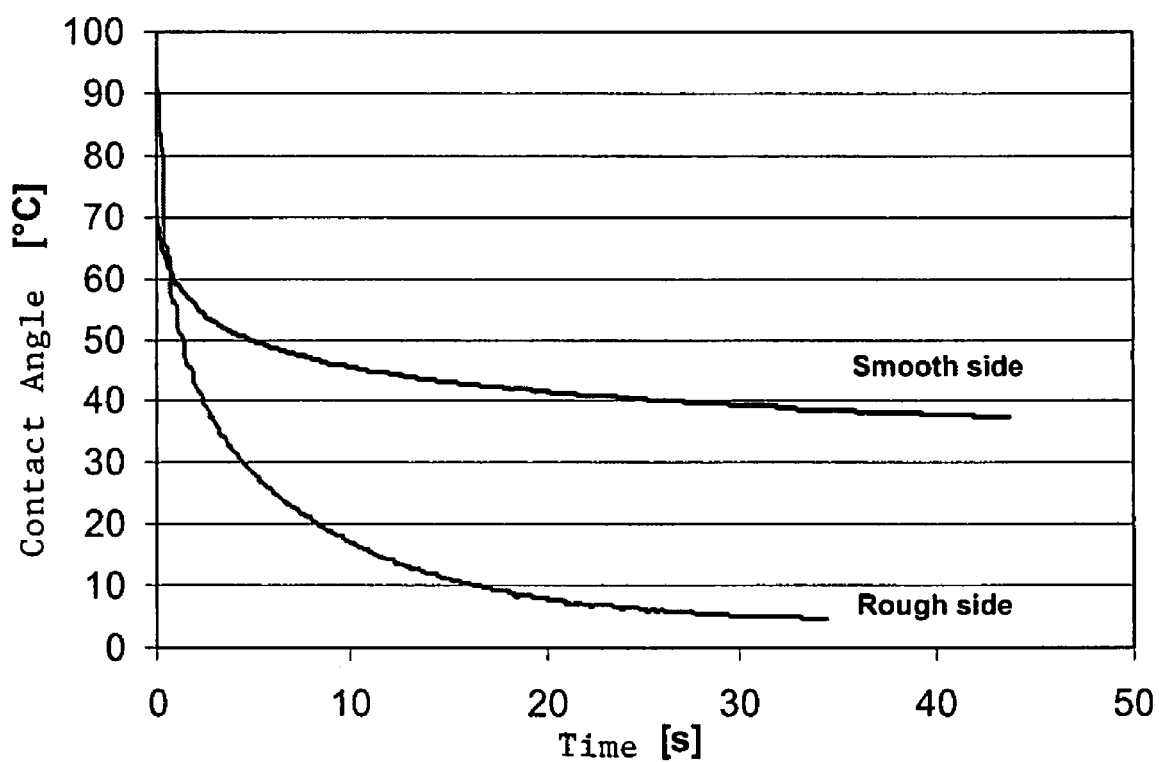
FIG. 4 is a plot showing the reduction in the contact angle as a function of time on the smooth and the rough membrane surface.

FIG. 4 shows the reduction in the contact angle as a function of time on the smooth and the rough membrane surface. It can clearly be seen that after some time a constant value is reached and no further noteworthy liquid absorption takes place. The absorption of the acid took place on the roughened side of the film not only much more rapidly, but also more completely.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A polymer film comprising a polyazole polymer, said film having a smooth and a rough side, wherein the roughness of the smooth side is less than 2 μm and the roughness of the rough side is between 3 to 10 μm.

2. The polymer film according to claim 1, wherein said polyazole polymer comprises one or more recurring azole units of the general formulas (I) through

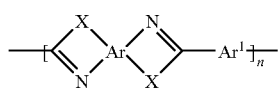
(I)

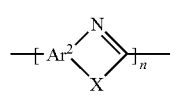
(II)

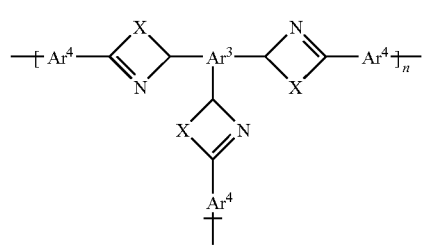
(III)

-continued

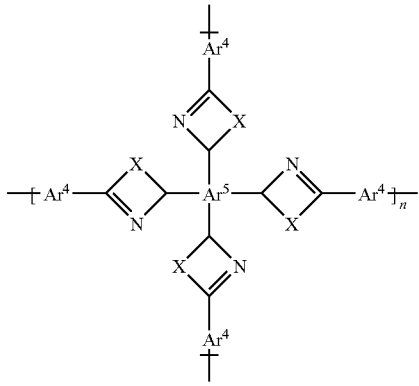
(IV)

(XXII):

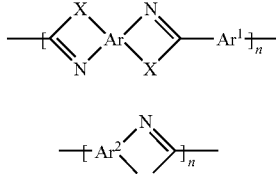
(I)

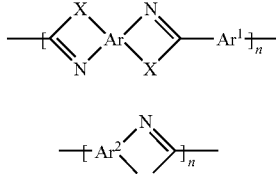
(II)

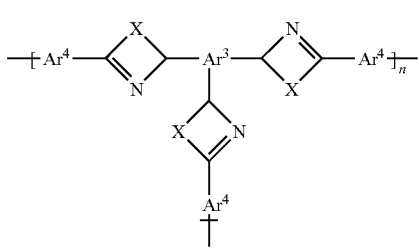
(III)

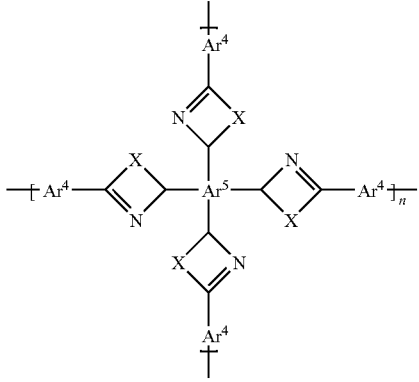
(IV)

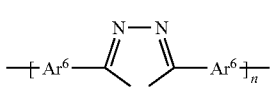
(V)

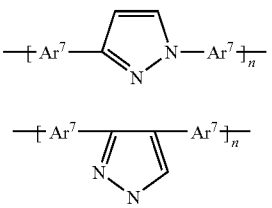
(VI)

(VII)

-continued

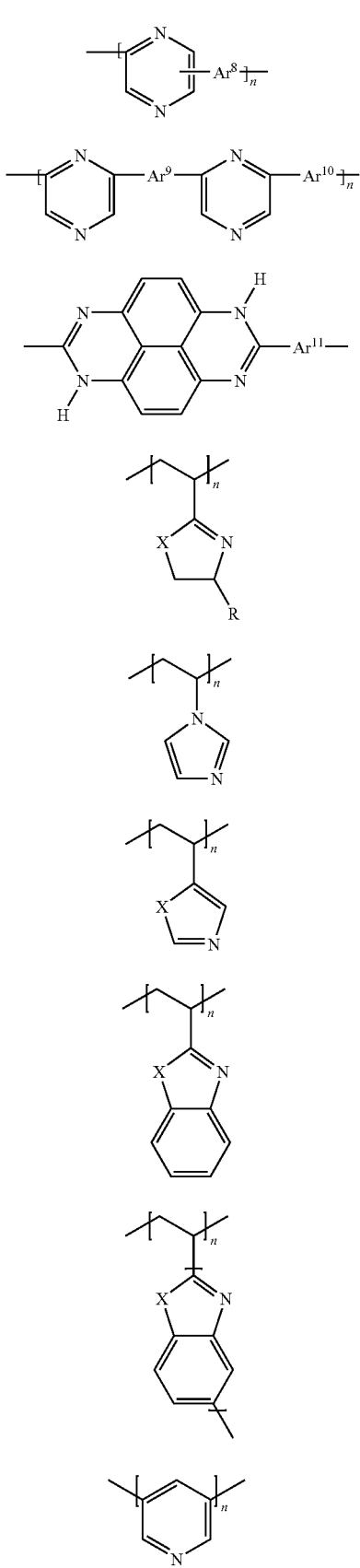

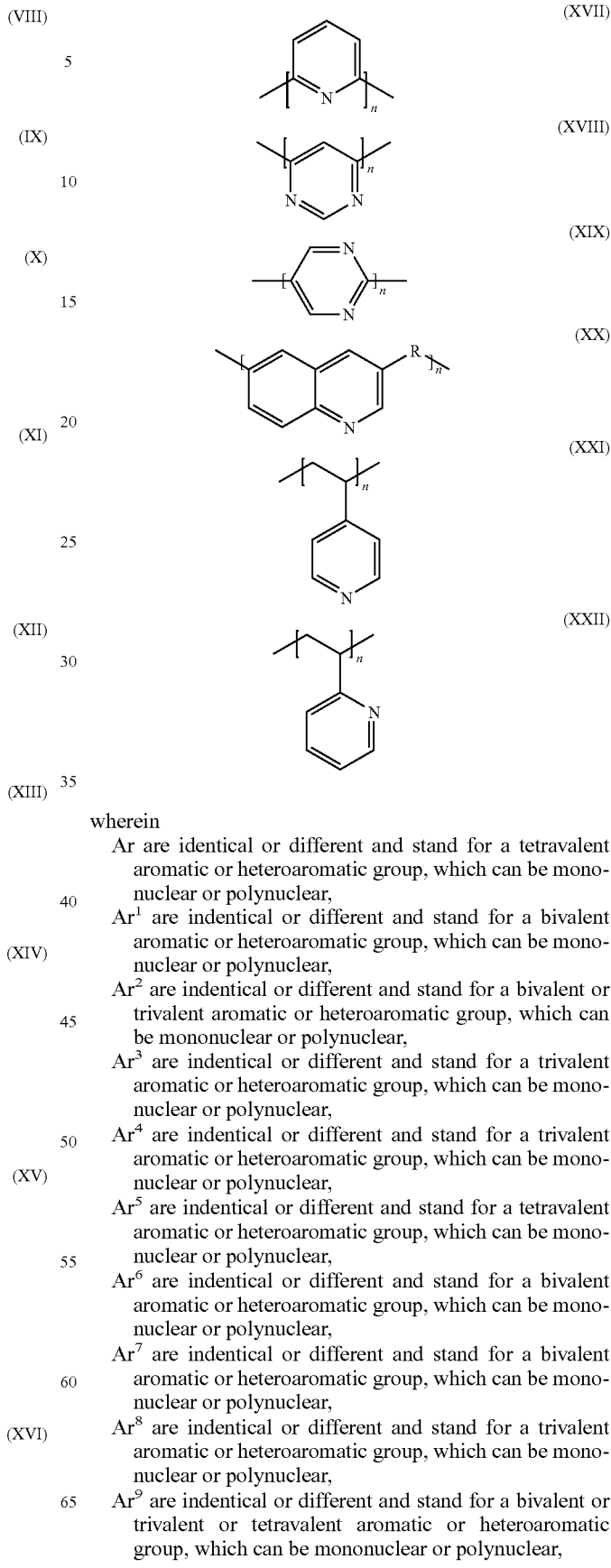

wherein
Ar are identical or different and stand for a tetravalent aromatic or heteroaromatic group, which can be mononuclear or polynuclear,
Ar¹ are indentical or different and stand for a bivalent aromatic or heteroaromatic group, which can be mononuclear or polynuclear,
Ar² are indentical or different and stand for a bivalent or trivalent aromatic or heteroaromatic group, which can be mononuclear or polynuclear,
Ar³ are indentical or different and stand for a trivalent aromatic or heteroaromatic group, which can be mononuclear or polynuclear,
Ar⁴ are indentical or different and stand for a trivalent aromatic or heteroaromatic group, which can be mononuclear or polynuclear,
Ar⁵ are indentical or different and stand for a tetravalent aromatic or heteroaromatic group, which can be mononuclear or polynuclear,
Ar⁶ are indentical or different and stand for a bivalent aromatic or heteroaromatic group, which can be mononuclear or polynuclear,
Ar⁷ are indentical or different and stand for a bivalent aromatic or heteroaromatic group, which can be mononuclear or polynuclear,
Ar⁸ are indentical or different and stand for a trivalent aromatic or heteroaromatic group, which can be mononuclear or polynuclear,
Ar⁹ are indentical or different and stand for a bivalent or trivalent or tetravalent aromatic or heteroaromatic group, which can be mononuclear or polynuclear, Ar¹⁰ are indentical or different and stand for a bivalent or trivalent aromatic or heteroaromatic group, which can be mononuclear or polynuclear, Ar¹¹ are indentical or different and stand for a bivalent aromatic or heteroaromatic group, which can be mononuclear or polynuclear, X is identical or different and stands for oxygen, sulphur or an amino group, which carries a hydrogen atom, a group having 1-20 carbon atoms, preferably a branched or unbranched alkyl or alkoxy group, or an aryl group as a further radical, R identical or different, stands for hydrogen, an alkyl group and an aromatic group, whereby radical R in formula (XX) is different from hydrogen, and n, m is a whole number greater than or equal to 10, preferably greater than or equal to 100.

3. The polymer film according to claim 1, wherein said polyazole polymer comprises one or more recurring azole units of the general formulas (XXIII) through (XLIV):

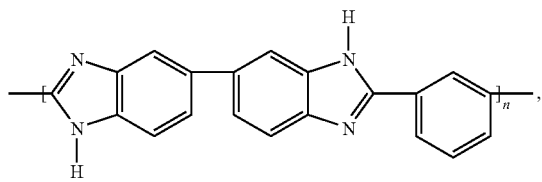
(XXIII)

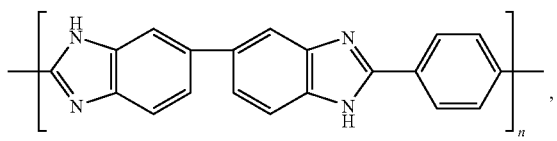
(XXIV)

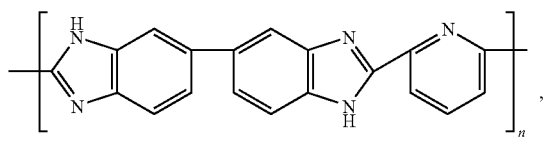
(XXV)

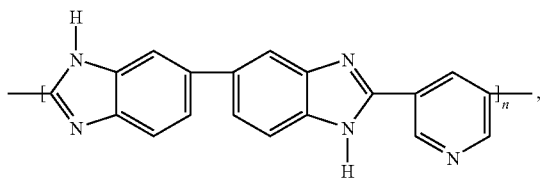
(XXVI)

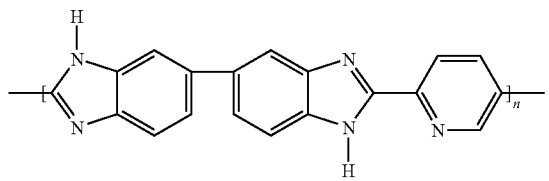
(XXVII)

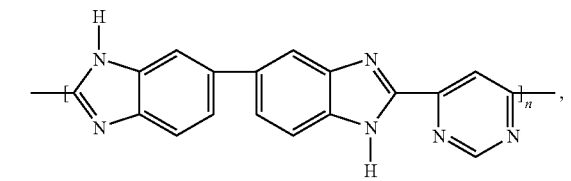
(XXVIII)

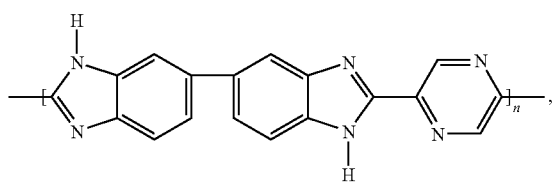
(XXVIIIA)

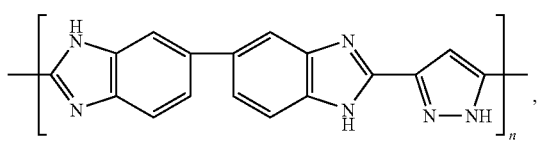
(XXIX)

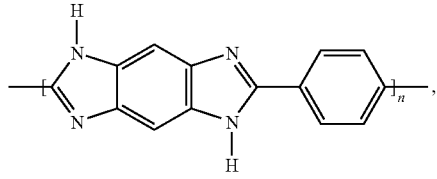
(XXX)

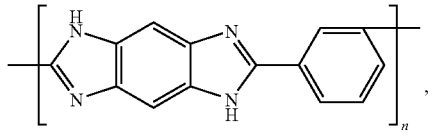
(XXXI)

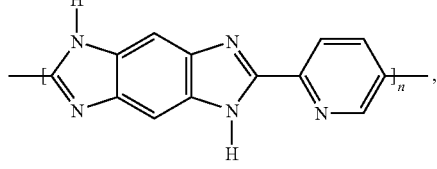
(XXXII)

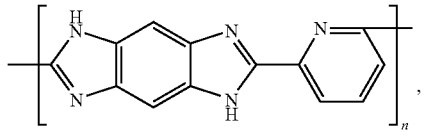
(XXXIII)

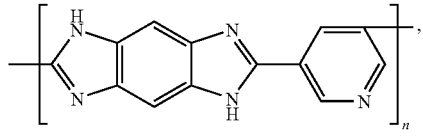
(XXXIV)

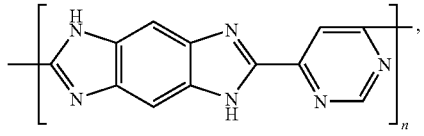
(XXXV)

-continued

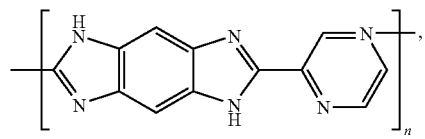
(XXXVI)

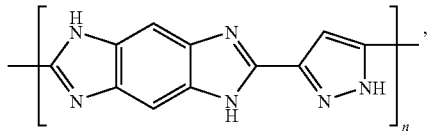
(XXXVII)

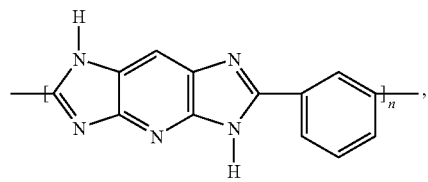
(XXXVIII)

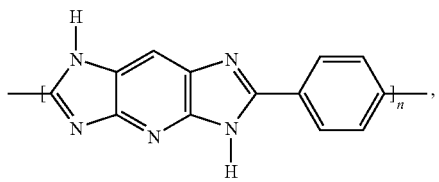
(XXXIX)

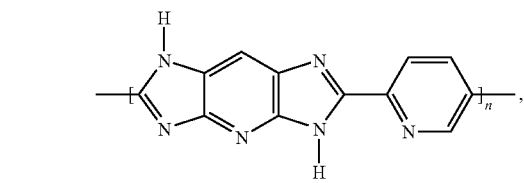
(XL)

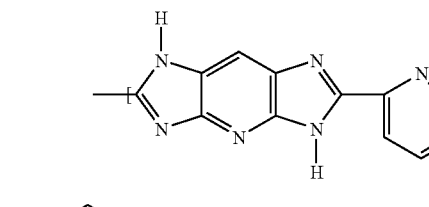
(XLI)

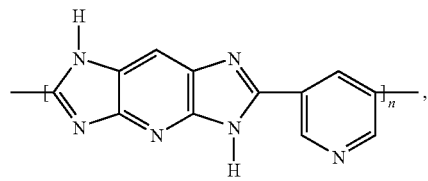
(XLII)

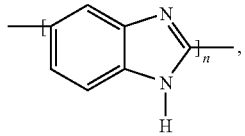
(XLIII)

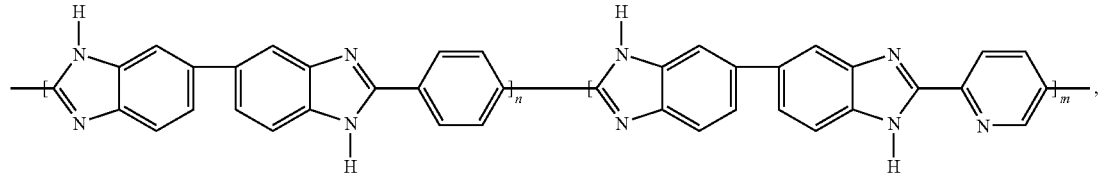
(XLIV)

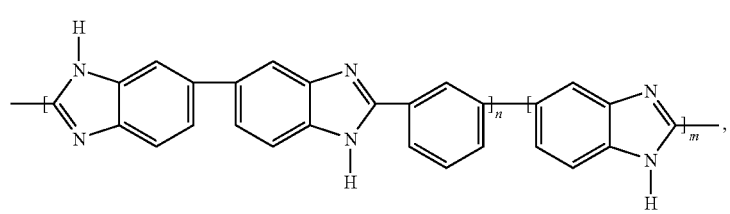
(XLV)

wherein n and m is a whole number greater than or equal to 10.

4. A method for the production of a polymer film comprising a polyazole polymer,
said film having a smooth and a rough side, the method comprising the steps of:
 a. deposition of a solution and/or suspension containing polyazole polymer in a solvent on a carrier, the surface whereof is roughened in such a way that the desired roughness is obtained, with the formation of a two-dimensional layer;
 b. drying of the layer formed according to step (a); and
 c. detachment of the dried polymer film from the carrier,
wherein the roughness of the smooth side is less than 2 μm and the roughness of the rough side is between 3 to 10 μm.

5. The method according to claim 4, wherein the solvent is a polar aprotic solvent.

6. The method of claim 5, wherein the solvent is N,N-dimethylacetamide.

7. The method according to claim 4, wherein the layer produced in step (a) has a thickness between 15 and 4000 μm.

8. The method according to claim 4, wherein the carrier used in step (a) is an inert carrier.

9. The method of claim 8, wherein the inert carrier is a metal strip.

10. The method according to claim 8, wherein the carrier has a roughness equal to roughness of the polymer film.

11. The method according to claim 4, further including a step of crosslinking the polymer after step (c).

12. The method according to claim 4, wherein step (a) includes adding additional fillers.

13. The method of claim 12, wherein the additional fillers are proton-conducting fillers.

14. An electrochemical cell, comprising at least one polymer membrane comprising a polyazole polymer film, said film having a smooth and a rough side and at least one electrode, wherein the roughness of the smooth side is less than 2 µm and the roughness of the rough side is between 3 to 10 µm.

15. A membrane electrode unit, comprising at least one polymer membrane comprising a polyazole polymer film, said film having a smooth and a rough side and at least one electrode, wherein the roughness of the smooth side is less than 2 µm and the roughness of the rough side is between 3 to 10 µm.

16. The membrane electrode unit according to claim 15, wherein the polymer membrane is doped with at least one Lewis and/or Brønsted acid.

17. The membrane electrode unit of claim 16, wherein the at least one acid is sulphuric acid or phosphoric acid.

18. The membrane electrode unit of claim 17, wherein the at least one acid is phosphoric acid.

19. A fuel cell, comprising at least one membrane electrode unit according to claim 15.

* * * * *